April 19, 1966     A. KARPER     3,246,940
CARD FILING DEVICE

Filed March 6, 1963     6 Sheets-Sheet 1

*INVENTOR.*
Albert Karper
BY
ATTORNEY

April 19, 1966 A. KARPER 3,246,940
CARD FILING DEVICE
Filed March 6, 1963 6 Sheets-Sheet 3

INVENTOR.
Albert Karper
BY Irving Seidman
ATTORNEY

April 19, 1966  A. KARPER  3,246,940
CARD FILING DEVICE
Filed March 6, 1963  6 Sheets-Sheet 4

INVENTOR.
Albert Karper
BY
ATTORNEY

April 19, 1966  A. KARPER  3,246,940
CARD FILING DEVICE
Filed March 6, 1963  6 Sheets-Sheet 5

INVENTOR.
Albert Karper
ATTORNEY

April 19, 1966     A. KARPER     3,246,940

CARD FILING DEVICE

Filed March 6, 1963     6 Sheets-Sheet 6

INVENTOR.
Albert Karper
BY
ATTORNEY

United States Patent Office 3,246,940
Patented Apr. 19, 1966

3,246,940
CARD FILING DEVICE
Albert Karper, New York, N.Y.
(555 Kappock St., Riverdale, N.Y.)
Filed Mar. 6, 1963, Ser. No. 263,222
6 Claims. (Cl. 312—279)

This invention relates in general to a card filing device, and more specifically to a new and improved card filing device in which the card holding means is tilted at an angle with respect to the horizontal and pivotable about a horizontal axis between a substantially upright stowed position and a horizontally disposed operative position.

Heretofore, conventional card filing devices comprised either the sliding drawer type card file, or the rotary type card file. While each of the respective type card file devices have been widely accepted and is much used today, each system is attended with specific inherent disadvantages. For example, with the drawer type file devices, it is required that the housing for accommodating the file drawer has a width or depth substantially equal to the length of the card filing drawer housed therein. Therefore, in order to utilize sliding drawer type filing devices, the sliding drawer when opened for filing purposes required additional space at least equal again to the length of the drawer. Therefore the minimum amount of space which is required for sliding drawer type filing devices is a horizontal distance equal to at least two times the length of the file drawer. Another disadvantage of a sliding drawer type filing device is that the drawer can be inadvertently pulled completely out of the housing when in use. When this occurs, inevitably the drawer will fall to the floor thus causing the cards filed therein to become disarranged in the event they are loosely filed therein.

In rotary type filing devices, the arrangement is such that cards can not be loosely filed therein. Because of the rotating motion, means are required to maintain the cards secured onto the file wheel. Thus mechanical manipulation is required on the part of the operator to insert and remove cards filed in such rotary devices. Also specially constructed filing cards are required. With the rotary card files, an operator is also not afforded the advantage of viewing all of the cards filed thereon at a glance.

Therefore an object of this invention is to provide a new and novel card filing device which will result in obtaining the combined advantages of both the sliding drawer and rotary type filing device without any of the inherent disadvantages thereof.

Another object of this invention is to provide an improved card filing device which will occupy a minimum of space in both the operative and inoperative position thereof.

Still another object is to provide a card file having a tiltable card holding compartment which is pivotally mounted with respect to its housing for movement between a substantially upright stowed position and a horizontally disposed operative position in which all of the cards filed therein are rendered visible at a glance and readily accessible.

Another object is to provide for an angularly inclined housing which permits for a relatively simple pivotal suspension of a tilting card holding compartment to be balanced so as to require a minimum of effort to open and close the same.

Another object is to provide a card holding file in which cards can be loosely filed therein, constructed and arranged so that the card holding compartment can be pivoted to an upright inoperative position without having the cards becoming disarranged therein.

Another object is to provide a noiseless operating card file in which a card holding compartment is pivotally connected to its housing.

Still another object is to provide a card file having a tiltable card holding compartment constructed and arranged so as to be readily detachably connected to its housing.

Still another object is to provide a card filing arrangement in which the housing can assume various forms, and a card holding compartment being constructed and arranged so as to be readily interchanged for use in any of the various housing constructions.

Still another object is to provide a card filing device in which the housing for containing a plurality of card holding compartments is rendered rotatable about a vertical axis and the respective card holding compartments being readily detachable and hingedly connected to the housing for movement about a horizontal axis.

Still another object is to provide for a novelly constructed card holding compartment which is adapted to be pivotally mounted with respect to its housing.

It is still another object to provide for a uniform tilting compartment which can be readily slipped into hinging connection in either a single unit or a multi-compartmented housing.

Still another object is to provide for a novel card holding compartment that can be up-ended so as to set in a shelf-like housing.

Still another object is to provide for a tilting card filing compartment which is readily adapted for use in individual unit housing, or in multiple in line unit housing or in multiple housing rotating about a vertical axis.

Still another object is to provide a novel, tiltable card filing device which will occupy a minimum of space in either the operative or inoperative position thereof, and one which is relatively simple in construction, economical to manufacture, and positive in operation.

In accordance with this invention the foregoing objects, and other features and advantages are attained by a card filing device comprising essentially a means defining an opened front housing which has pivotally connected thereto a card holding compartment arranged to pivot between an up-ended stowed position so that the open end of compartment is disposed within the housing and in horizontal operative position whereby access is readily afforded to all of the cards disposed in said compartment. In accordance with this invention the cards may be loosely filed within the compartment and the compartment balanced when stowed so as to prohibit the card from becoming loose therefrom. Cooperating means are provided on the housing and the compartment so as to effect a balanced, effortless and noiseless operation. The portion of the cooperating means located on the housing further functions to prevent the cards from falling out of the compartment when the same is up-ended in its stowed position. Means can also be provided for rendering the card holding compartment readily detachable from its respective housing, said means being constructed and arranged so as to prohibit detachment when the card holding compartment is tilted into open operative position.

This invention further contemplates a card holding compartment constructed and arranged so as to have in one form a hinged front wall and a cooperating hinged flap which are adapted to compress the column of cards filed therein when the card holding compartment is up-ended into its stowed position, and when the compartment is pivoted to its operative position the front wall is pivoted outwardly about its axis so as to spread the cards in the column within the compartment to facilitate reading of the same. A combined tab holder and stop means is connected to the front wall of the compartment to limit the outward movement thereof, and means are operatively associated with the front wall of the compartment for containing the side walls when the compartment is rendered operative.

The invention further contemplates several distinct housing embodiments to provide for an individual or single compartment device, or multiple compartment housings of in-line construction which are stackable one on another, or multiple compartment housing rotatable about a vertical axis.

One of the features of this invention resides in the provision wherein the card holding compartment can be readily interchanged or used in any of the housing constructions disclosed herein.

Another feature of this invention resides in the provision wherein the respective card holding compartment utilizes a vertical space when stowed in its inoperative position, and therefore requires very little desk space when used as a desk file.

Another feature resides in the provision that all of the cards in the card holding compartment are completely visible when rotated to operative position.

Still another feature resides in the provision wherein the card holding compartment is balanced so as to be opened with a minimum of effort or force.

Another feature resides in the provision that standard type cards can be loosely filed in the card holding compartment.

Other features and advantages will become more readily apparent when considered in view of the drawings and description thereof in which.

Figures 1, 2, 13, 14, 15, 15A:
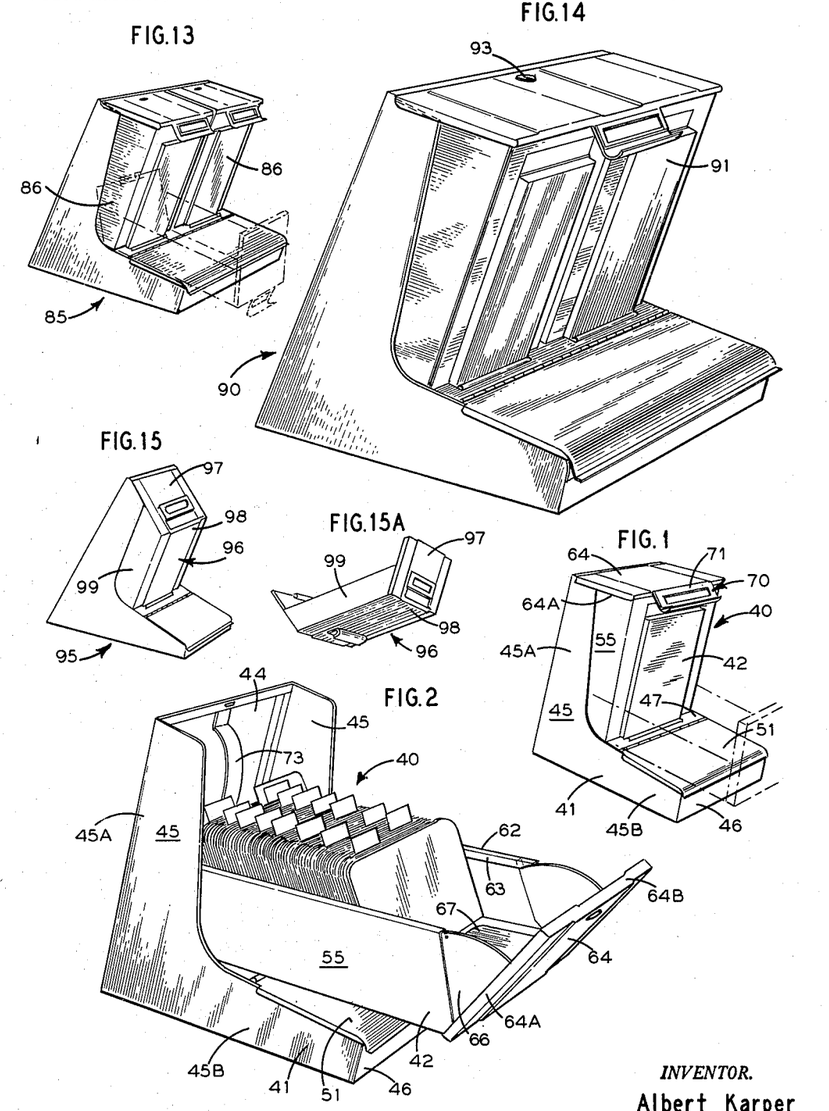
FIG. 1 is a perspective view of a card filing device of this invention with the card holding compartment illustrated in its up-ended stowed position.
FIG. 2 is a perspective view of the device of FIG. 1 showing the card holding compartment rotated into operative position.
FIG. 13 is a slightly modified embodiment showing a double width compartment.
FIG. 14 is still another modified embodiment.
FIG. 15 illustrates still another embodiment.
FIG. 15A is a perspective view of the drawer used in FIG. 15.
Figures 3, 5:
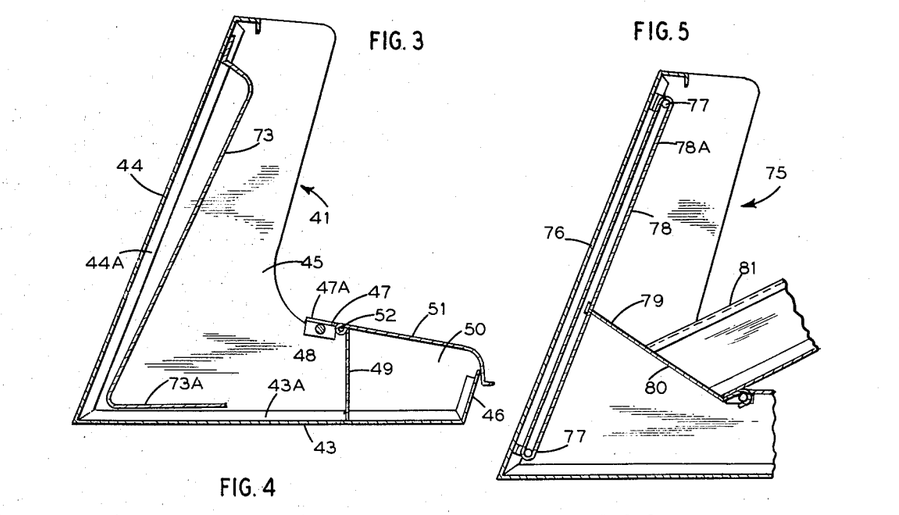
FIG. 3 is an enlarged sectional side view of the housing construction only of the device of FIG. 1.
FIG. 5 is a sectional side view of a slightly modified housing construction showing a fragmentary portion of the card holding compartment at an intermediate position.

Referring to the drawings, there is shown in FIGS. 1 and 2 an embodiment of an improved card filing device 40 constructed in accordance with this invention. Essentially the card filing device 40 comprises a housing 41 and a card holding compartment 42 pivotally connected thereto for movement between an up-ended stowed position and a horizontally disposed operative position in which all of the cards filed therein are rendered readily visible and accessible. As shown in FIGS. 1 to 4, the housing 41 comprises a horizontal base or bottom wall 43 and a back wall 44 inclined at an acute angle with respect thereto. The respective base wall 43 and back wall 44 are provided with peripheral flange portions 43A, 44A against which a pair of opposed substantially L-shaped side walls 45 are connected as by spot welding or the like. As shown the opposed side walls 45 include an upright leg portion 45A and a horizontally disposed leg portion 45B. The base, back and opposed side walls 43, 44 and 45, respectively, thus define an open front housing 41. In the illustrated embodiment the forward edge 46 of the base plate 43 is turned upwardly as seen in FIGS. 1 to 3.

Figures 4, 6, 16:
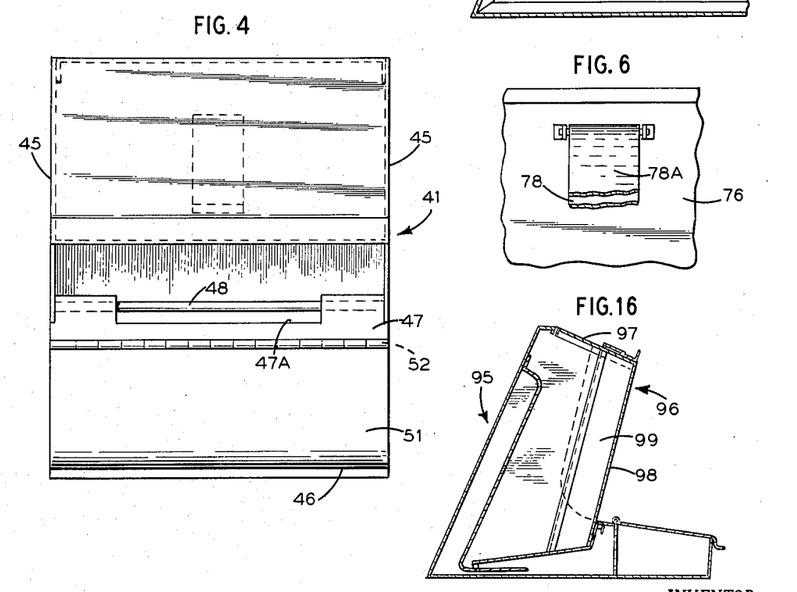
FIG. 4 is a top plan view of the housing construction of FIG. 3.
FIG. 6 is a front view of a fragmentary portion of the housing construction of FIG. 5.
FIG. 16 is a side sectional view of the embodiment of FIG. 15.

In accordance with this invention a cross-piece 47 is connected between the horizontal leg portion 45B of the respective side walls 45 adjacent the junction thereof with the upright leg portions 45A of the side walls. As best seen in FIGS. 3 and 4, the rearward edge of the cross-piece 47 is provided with a centrally disposed notched out area as indicated at 47A, and a hinge pin 48 is connected to extend across the notch 47A intermediate the width thereof. Also, in accordance with this invention, if desired, a vertical partition 49 is disposed between the side walls 45 and between the base wall 43 and cross-piece 47 to define with the upturned forward edge 46 of the bottom wall a compartment 50 which may be used to store miscellaneous articles such as clips, tabs, cards and the like which may be incidentally used when filing. A hinged cover 51 is pivotally mounted by a hinge piece 52 to the cross-piece 47 to define a closure for the miscellaneous compartment 50 defined.

Figure 7:
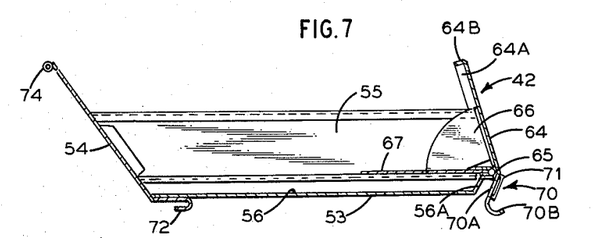
FIG. 7 is a detached sectional side view of the card holding compartment of FIG. 1.
Figure 8:
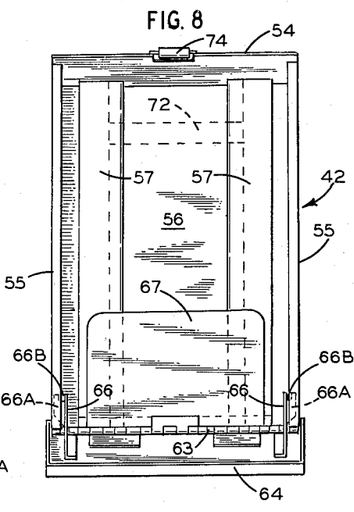
FIG. 8 is a plan view of FIG. 7, but showing the front wall of the compartment pivoted outwardly.

In accordance with this invention a card holding compartment 42 is constructed and arranged so as to be detachably and pivotally connected to the housing 41 defined for movement between an up-ended stowed position as shown in FIG. 1, and an open operative position as shown in FIG. 2. Referring to FIGS. 7 to 12 the card holding compartment or drawer 42 comprises a bottom wall 53 having an integrally connected rear wall 54 and a pair of opposed upright side walls 55 integrally connected to the longtitudinal edges of the bottom wall 53. As best seen in FIG. 10, the bottom wall 53 is defined with a recessed longitudinally extending groove or channelway 56. Extending along the channelway 56 are a pair of elongated plate members 57 which are connected to the elevated portion of bottom wall 53 adjacent the channelway 56. Referring to FIGS. 8 and 10 it will be noted that inner edge 57A of the elongated member 57 overhangs the channelway 56 and defines with the bottom thereof a guideway for receiving an index card 58, of the type shown in FIG. 11.

Figure 11:
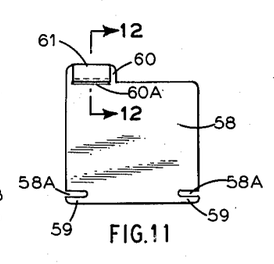
FIG. 11 is a detailed front view of an index card for use in comparts of FIG. 7 to FIG. 10.

As shown in FIG. 11, the index card 58 constitutes a substantially rectangular card having a notch portion 58A adjacent the bottom thereof to define opposed tongue portions 59. The index card, when fitted into the drawer 42, is arranged so that the overhang portions 57A of the elongated members 57 are received in the notches 58A and the tongue portion 59 thereof being disposed below the overhang of members 57. Thus the index card 58 is secured within the drawer, yet is free to be shifted longitudinally of the drawer.

The index card 58 is also provided with an ear 60 formed along the upper edge thereof for identification purposes. As shown, the card 58 is provided with a slot 60A for receiving the lower edge portion of an L-shaped translucent clip 61. The upper end of the clip 61 is curled over the top of the card ear 60. Thus the clip 61 is securely fastened to the card 58. An index number or letter slip can thus be placed between the ear 60 and the face portion of the clip 61 to identify the index card.

Referring again to the drawer or compartment construction 42, it will be noted that the respective side walls 55 at their upper ends is provided with an inturned flange 62 which terminates in a depending flange portion 63 spaced from its respective side wall 55. Also that the rear wall 54 extends upwardly and outwardly at an angle with respect to the bottom wall 53, and that it is made higher than the side walls 55.

In accordance with this embodiment the front wall 64 of the compartment is pivotally connected to the bottom wall 53 by a piano type hinge construction 65. As shown in FIGS. 1 and 2 the front wall 64 is provided with side and top peripheral inturned flange portions 64A, 64B. In the stowed position the side flange portions 64A are arranged to embrace the side walls 55 of the compartment and the top flange portions 64B are disposed contiguous to the inturned flange of the back wall 44 of the housing 41.

Figures 9, 12:
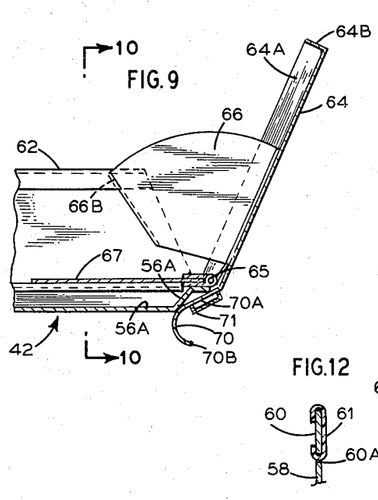
FIG. 9 is a fragmentary sectional side view of the compartment of FIG. 7 showing the front wall pivoted outwardly in the operative position thereof.
FIG. 12 is a sectional view taken along line 12—12 of FIG. 11.
Figure 10:
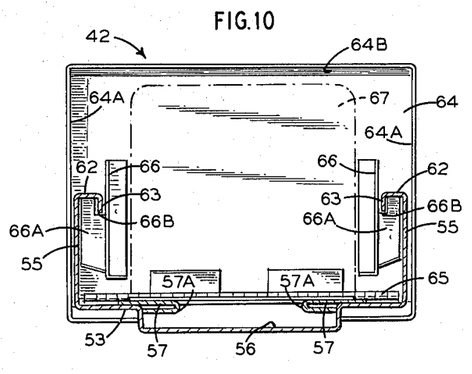
FIG. 10 is a sectional view taken along line 10—10 of FIG. 9.

Connected to the front wall 64 are a pair of spaced arcuate shaped plates or gussets 66 for bridging the space between the front wall 64 and the side walls 55 when the front wall 64 is pivoted outwardly as shown in FIGS. 2 to 9. As best seen in these figures, the respective gussets 66 are provided with outwardly turned flanges 64A. Adjacent the upper end of the gusset flange 66A at the bend thereof, there is provided a slot 66B which is adapted to receive the depending edge 63 of the side wall flange 62. Thus it will be noted, as seen in FIGS. 8 to 10, that the gussets 66 serve to prohibit lateral or outward displacement of the side walls 55 when the front wall 42 of the compartment 41 is tilted forwardly. Thus the gussets 66 function to contain the side walls 55 of the compartment 41. In the closed position of the front wall 64, the side flanges 64A thereof are in overlapping relationship with the side walls 55 and thus function to contain the side walls 55.

Operatively associated with the front wall 64 is flap 67 which is hingedly connected to the hinge pin 65. The function of the flap 67 is to compress the column of cards filed in the card compartment 41 in the stowed position thereof, and to extend the column of cards when the drawer is in operative position with the front wall 64 pivoted outwardly.

To limit the forwardly tilting movement of the front wall 64 of the card holding compartment a combined tab holder, handle and stop means 70 is provided. As shown in FIGS. 7 and 9 the stop means comprises a depending tab 70A connected to the front wall and it extends below the bottom wall 53 of the compartment. A finger grip portion 70B is bent forwardly of the depending tab portion 70A. A clip 71 having a window or cutout portion is clamped onto the surface of the tab portion 70A and forms the frame for the index or name plate identifying the subject matter filed. The arrangement of the stop tab means 70 is such that the curved finger portion 70B abuts the leading wall portion 56A of the channelway 56 formed in the bottom wall of the compartment, and thus defines the stop for the front wall 64. See FIG. 9.

In order that the card holding compartment 42 may be detachably and hingedly connected to the housing 41, detachable hinge means is provided. As best seen in FIGS. 5, 7 and 16, the detachable hinge means comprises simply a hook shaped plate 72 connected to the bottom wall 53 of the compartment adjacent the rear wall 54 thereof. Thus to attach the compartment 42 to the housing 41, the card holding compartment is simply set on end and the hook portion 72 slipped over the hinge pin 48. With the construction described the card file compartment 42 can be readily pivoted about pin 48 from a position of FIG. 1 to that shown in FIG. 2. It is to be noted that with the drawer 42 in the operative position as shown in FIG. 2, it is rendered impossible to unhook the drawer 42 by any pull force applied thereto. Before the compartment can be removed it must be up-ended so that the hook hinge 72 can be slipped off its hange pin 48.

To provide for effortless and noiseless operation cooperating means are provided on the housing and the compartment. For example, in the form of the invention shown in FIGS. 1, 2, 3 and 7 to 12, a spring lever 73 is fixed to the rear or back wall 44 of the housing 41. As shown in FIG. 3, it is fixed at its upper end, and is free at its lower end, the lower end being provided with a forwardly extending piece 73A disposed adjacent the bottom wall 43 of the housing. Cooperating therewith is a roller 74 rotatably journalled on the rear wall 54 of the compartment 42. Thus in operation it will be apparent that the roller 74 on drawer 42 is disposed in rolling engagement with the flat spring 73. The forwardly extending piece 73A prohibits the cooperating roller 74 from becoming disengaged when the compartment 42 is up-ended. See FIG. 16.

FIGS. 5 and 6 illustrate a slightly modified means for effecting noiseless operation. In this form of the invention the housing 75 has connected to its back wall 76 in vertically spaced relationship a pair of rollers 77 over which an endless belt or tape 78 is threaded. Intermediate the end of the forward run 78A of the tape there is provided a hole for receiving a projection 79 connected to the rear wall 80 of the compartment 81. Thus, as the compartment 81 is pivoted between operative and inoperative position the back wall 80 of the compartment causes the tape 78 to be noiselessly displaced therewith, the tape 78 flexing somewhat to provide balanced operation of the drawer 81. In accordance with this invention the angle of slope of the housing rear wall 44 and the manner in which the compartment 42 is pivoted therein in such that the compartment 42 is balanced in such a manner that a minimum of effort is required to operate the same.

From the foregoing description it will be noted that the card holding compartment 42, when stowed in the up-ended position as shown in FIG. 1, is disposed at an angle such that standard loosely mounted cards can be filed in the compartment without becoming disarranged. Also it is to be realized that the flat spring 73 of FIG. 2 and the endless belt 78 of FIG. 5 function to hold the cards in place in the up-ended position of the compartment in the event any loose card therein seeks to become disarranged.

The back wall 44 of the compartment 42 is angled so that in the upright position thereof, it is disposed substantially parallel or horizontal to the base wall of the housing.

FIG. 13 illustrates a slightly modified form of the invention. This form illustrates a housing 85 similar to that described with reference to FIG. 1, except that it is sized to accommodate two card holding compartments 86 of the type described with reference to FIG. 1. Each compartment 86 can be individually pivoted as indicated in the phantom position thereof in FIG. 13.

FIG. 14 illustrates a slightly modified construction. In this form the housing 90 is similar to that of FIG. 13, but the drawer 91 is of double width. In all other respects the construction is similar to that hereinbefore described. If desired a suitable key lock 92 may be provided to lock the card holding compartment 91 in the up-ended stowed position.

FIGS. 15, 15A and 16 illustrate a simplified form of the invention. In this form the housing 95 is constructed in a manner similar to that described with reference to FIG. 1. The card holding compartment 96 is modified to the extent that the front wall 97 thereof is fixedly or integrally connected to the bottom wall 98 and between the side wall 99 thereof. In all other respects the construction of FIGS. 15, 15A and 16 is substantially similar to that of FIG. 1.

Figure 17:
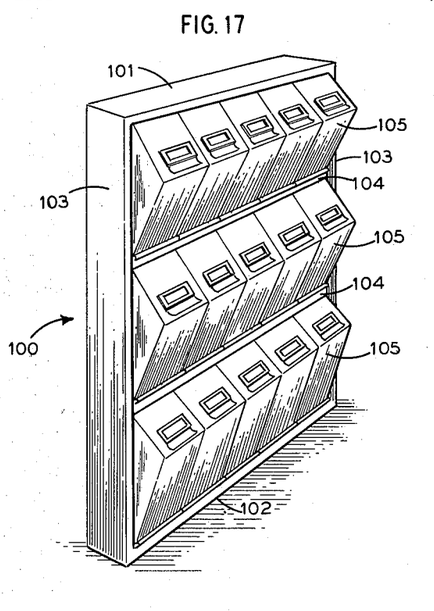
FIG. 17 illustrates a further embodiment shown in perspective.

FIG. 17 illustrates still another modified housing construction. In this form the housing 100 comprises a frame defined by top 101, bottom 102 and connected side walls 103. A series of intermediate shelves 104 are vertically spaced between the top and bottom walls 101, 102. The bottom wall 102 and each of the shelves 104 is provided with a series of slots for receiving the hook hinge of the respective card holding compartment 105 so that the same is pivotally mounted in a manner hereinbefore described. Thus this form of the invention defines a housing 100 in which many of the card holding compartments 105, as hereinbefore described, can be housed.

Figure 18:
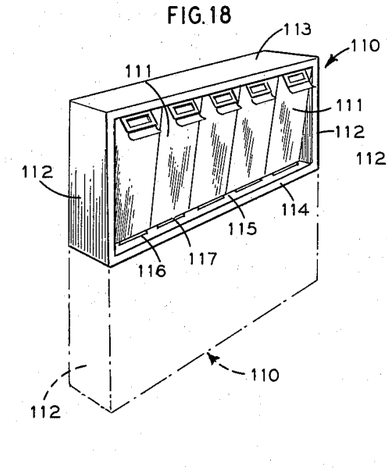
FIG. 18 is still another embodiment shown in perspective.
Figure 19:
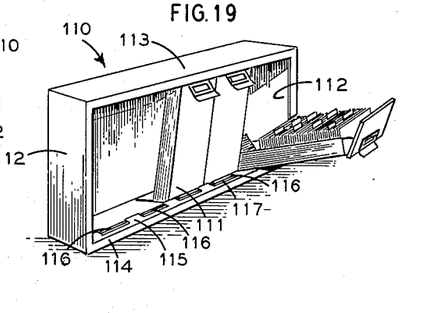
FIG. 19 illustrates a perspective view of FIG. 18 showing some of the compartments removed and another pivoted toward operative position.

FIGS. 18 and 19 illustrate a stackable type housing 110 in which a multiple number of compartments 111 are disposed in line. In this form the housing 110 comprises a pair of end walls 112 connected between a top and bottom wall 113, 114. The bottom wall 114 is provided with an inturned flange portion 115 which has formed therein a series of spaced slots 116 or openings for receiving the hook hinge 117 of the respective card holding compartments 111. FIG. 19 illustrates the housing 110 in which several card holding compartments 111 have been removed and another is shown in its partially open position. The ledge or flange 115 is sufficiently deep to provide a support for the card holding compartment 111 in the open position thereof.

FIG. 18 illustrates how two or more of the housings 110 can be stacked one on the other.

Figure 20:
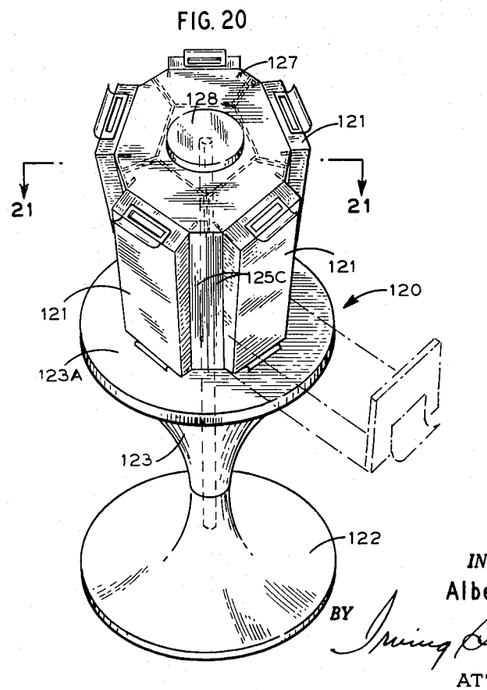
FIG. 20 is a perspective view of a modified housing construction rotatably mounted about a vertical axis.
Figure 21:
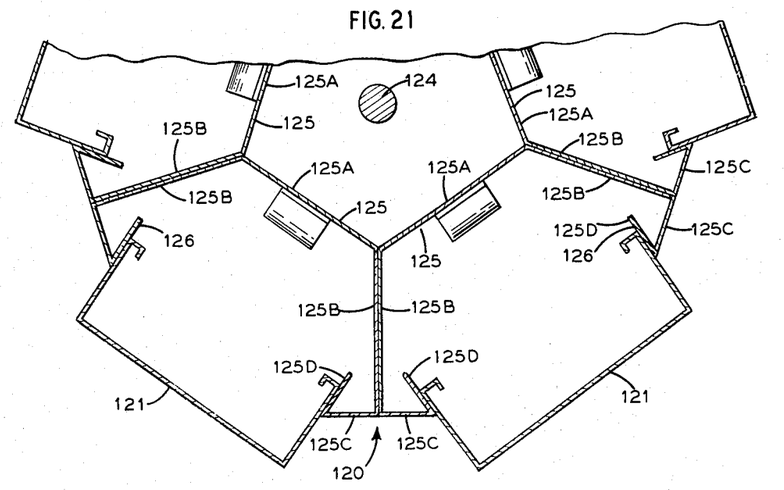
FIG. 21 is a partial plan sectional view taken along line 21—21 of FIG. 20.

FIGS. 20 and 21 illustrate a modified housing construction 120 in which the drawer or card holding compartment 121, constructed as herein described with reference to FIG. 1, may be rotatably mounted about a vertical axis. As shown in FIG. 20, the housing 120 comprises a pair of similarly constructed pedestal members 122, 123 which are connected in end to end relationship as shown. A spindle 124 is utilized to rotatably journal the upper pedestal 123 member to the lower pedestal. The top 123A of the upper pedestal member defines the base for the housing portion which receives the card holding compartments 121. As best seen in FIG. 21, the spindle 124 extends upwardly through the center of the housing 120. The housing proper in this form is defined by five similarly constructed panel sections 125 of which only two complete panels 125 are shown in FIG. 21. As shown, each of the panels 125 is bent so that when assembled a five compartmented housing 120 is formed. Referring to FIG. 21 each panel 125 is bent to define a central panel portion 125A and a pair of angularly disposed side panel portions 125B. Each of the side panel portions 125B is provided with an inturned flange 125C when in the assembled form, defining the front or outside wall portion of the housing. Each flange 125C has its outer edge 125D portion bent inwardly at an angle to define the open front opening 126 for receiving the card holding compartment 121 as described with reference to FIGS. 7 to 12. In assembling the five panels 125 as described the side panel portions 125B of adjacent panels are secured in back to back relationship. See FIG. 21. A top plate 127 forms the cover for the housing defined. A nut or the like 128 connected to spindle 24 secures the cover in place. Thus it will be noted that a multiple housing construction is afforded which is readily rotatable about a vertical axis.

Figure 22:
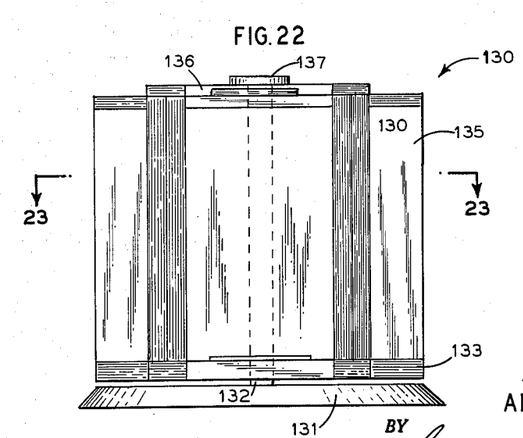
FIG. 22 is a further modification of a rotatable housing.
Figure 23:
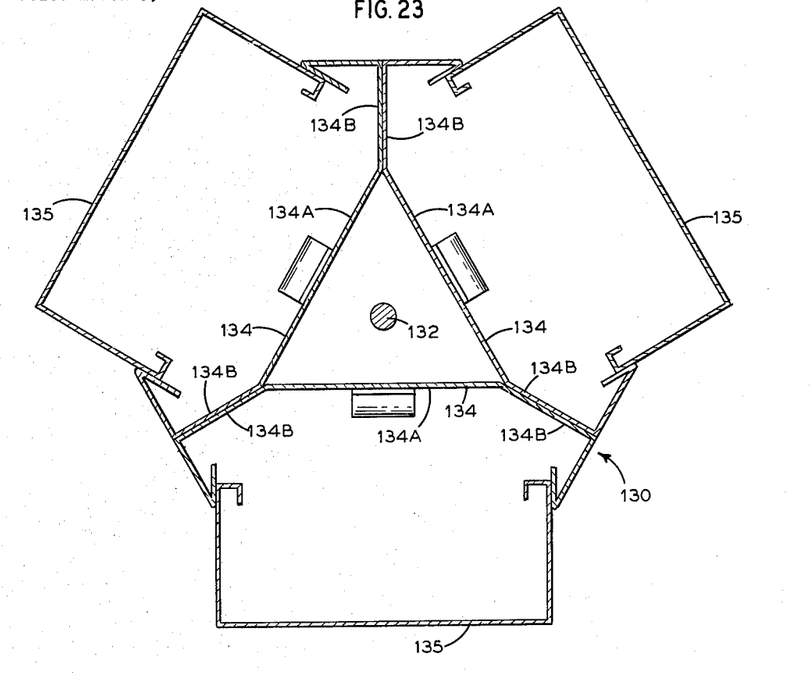
FIG. 23 is a plan sectional view taken along line 23—23 of FIG. 22.

FIGS. 22 and 23 illustrate a further modification of a rotary housing 130. This form is readily adapted for desk top use or the like. It comprises a base 131 to which there is rotatably journaled a spindle 132. The spindle 136 has fixed thereto the bottom wall 133 of the housing. Connected to the bottom wall 133 are a series of three upright panels 134 which are specifically bent to define a triangular shaped housing, i.e. a housing in which three card holding compartments 135, as herein described, are housed. Each of the panels 134 is formed in a manner similar to that described with reference to FIG. 21 except that the angle defined by the center portion 134A and each of the side portions 134B is greater. Thus it will be apparent from FIGS. 20 to 23 that any reasonable number of compartments can be housed in a housing journaled about a vertical axis merely by varying the number of panels and angles defined by the bent panel portions. To complete the housing of FIG. 22, a top panel 136 is centered onto the spindle 132, and a suitable capping nut 137 or the like secures the respective compartments of the housing together about the spindle. It will be apparent that the card holding compartments 131, 135 of FIGS. 20 to 23 are similar in every respect to that described with reference to FIGS. 7 to 12. Thus the function and operation of the card holding compartment of FIGS. 20 to 23 is the same as previously described. It will be understood that each of the housing constructions defined will include cooperating means of a flat spring or roller as described with reference to FIGS. 1 to 4 or the belt means of FIGS. 5 and 6.

From the foregoing it will be noted that while the respective housings may take on various configurations, the card holding compartment of FIGS. 7 to 12 can be readily interchanged from one housing to another. Therefore, from a manufacturing standpoint it is possible to attain a maximum amount of variety with the minimum of tooling cost.

In the rotary housing of FIGS. 20 to 23, it will be noted that the panels 125 or 134 of a given housing are all similar and thus can be readily manufactured and assembled. Further, the housing components of the other described housings comprise equally simple structures that can be readily fabricated and assembled. Thus from a production, cost and functional standpoint advantages are attained which are most favorable to both the manufacturer and the ultimate user.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:

1. A card file comprising a housing, a card holding compartment, said compartment including a bottom wall, a pair of side walls and a rear wall connected to said bottom wall and to said side walls, and a front wall, means for hingedly connecting said front wall to said bottom wall for movement relative thereto, a combined handle, tab holder and stop means connected to said front wall for limiting the pivotal movement thereof, means formed on said front wall for containing the side walls of said compartment in either pivotal position of said front wall, and means for detachably connecting and hingedly connecting said compartment to said housing for movement between an upright stowed position and a horizontal operative position.

2. A card holding compartment comprising
   (a) a bottom wall,
   (b) a pair of upright side walls connected to the opposed longitudinal edges of said bottom wall,
   (c) a rear wall fixedly connected to said bottom wall and to said side walls,
   (d) each of said side walls being provided along their respective upper longitudinal edges with an inturned flange terminating in a depending edge spaced from and parallel to its respective side wall,
   (e) a front wall hingedly connected to said bottom wall for compacting or spreading the cards filed in said compartment accordingly, (f) a pair of arcuate gussets connected normal to said front wall,
(g) said gussets being spaced just inwardly of depending edges of said inturned flanges, and
(h) means formed on said gusset for prohibiting the spread of said side walls in the outwardly pivoted position of said front wall,
(i) each of said gussets being provided with a slot formed adjacent its respective side wall,
(j) and said slot being adapted to receive the depending edge portions of said side wall flanges so as to prohibit outward spreading of said sidewalls in the outwardly pivoted position of said front wall.

3. The invention as defined in claim 2 wherein said front wall has inturned flange portions extending along the side edges thereof for overlapping the said walls in the inwardly pivoted position of said front wall whereby said front wall flanges restrain any spread of said side walls.

4. A card holding compartment comprising
(a) a bottom wall having formed therein a longitudinally extended recessed portion to define a channel therein,
(b) a pair of upright side walls connected to the opposed longitudinal edges of said bottom wall,
(c) a rear wall connected to said bottom wall and to said side walls, said rear wall being inclined at an obtuse angle to said bottom wall,
(d) each of said side walls being provided along their respective upper longitudinal edges with an inturned flange terminating in a depending edge spaced from and parallel to its respective side wall,
(e) a front wall hingedly connected to said bottom wall for compacting or spreading the cards filed in said compartment accordingly,
(f) a pair of gussets connected normal to said front wall,
(g) said gussets being spaced just inwardly of depending edges of said inturned flanges,
(h) said gusset having its free end terminating in a flange extending laterally outwardly therefrom, whereby said flange is disposed between a side wall and the depending edge of the flange connected thereto,
(i) each of said gussets being provided with a slot at the juncture of the flange and gusset at the upper end thereof,
(j) said slot being adapted to receive the depending edge of said side wall flanges so as to prohibit outward spreading of said side walls when said front wall is in its outwardly pivoted position,
(k) and said front wall having inturned flange portions extending along the side edges thereof for overlapping the said walls in the inwardly pivoted position of said front wall whereby said front wall flanges restrain any spread of said side walls,
(l) and means disposed within said compartment and connected to the bottom wall thereof for extending longitudinally thereof,
(m) said latter means including a pair of spaced apart plate members having an edge portion overhanging said channel to define a guideway adapted for slidably receiving an index card.

5. The invention as defined in claim 4 wherein a hook shape member is connected to the bottom wall adjacent the rear wall thereof for pivotally mounting said card holding compartment.

6. A card filing apparatus comprising,
(a) a housing,
(b) said housing being defined by a rear wall inclined at an acute angle with respect to a base wall, and a pair of L-shaped side walls having an upright leg portion and a horizontal leg portion connected to said back and base walls,
(c) a partition member interconnected between the horizontal leg portion of said side walls, said base and horizontal leg portion of said side walls extending beyond said partition member defining a miscellaneous compartment,
(d) a cross-piece interconnected between said side walls adjacent said partition member,
(e) means defining a slot in said cross-piece,
(f) a drawer means for loosely containing a plurality of cards,
(g) said drawer means including a hinge means which is received in said slot for pivotally mounting said drawer for movement between an up-ended stowed position and a horizontally disposed operative position,
(h) and a hinge cover connected to said cross-piece to form a closure for said miscellaneous compartment.

References Cited by the Examiner
UNITED STATES PATENTS

| | | | |
|---|---|---|---|
| 619,190 | 2/1899 | Knappenberger et al. | 312—120 |
| 779,950 | 1/1905 | MacLachlan | 312—183 |
| 779,951 | 1/1905 | MacLachlan | 312—183 |
| 1,211,798 | 1/1917 | Watson | 312—293 |
| 1,801,692 | 4/1931 | Rogers | 312—120 |
| 1,983,573 | 12/1934 | Straubel | 129—26 |
| 1,983,575 | 12/1934 | Straubel | 129—26 |
| 2,409,308 | 10/1946 | Paxton | 312—328 X |
| 2,749,202 | 6/1956 | Ritzerfeld et al. | 312—327 |
| 2,910,336 | 10/1959 | Mustee | 312—328 |

CLAUDE A. LE ROY, *Primary Examiner.*

CHANCELLOR E. HARRIS, FRANK B. SHERRY,
*Examiners.*